United States Patent [19]

Antoniello

[11] Patent Number: 4,955,406
[45] Date of Patent: Sep. 11, 1990

[54] CONNECTOR FOR WATER PIPES
[75] Inventor: Frank Antoniello, Commack, N.Y.
[73] Assignee: I.W. Industries, New York, N.Y.
[21] Appl. No.: 340,792
[22] Filed: Apr. 20, 1989
[51] Int. Cl.$^5$ .............. F16K 43/00; F16K 31/50; F16L 55/10
[52] U.S. Cl. .................. 137/318; 252/5; 252/91; 251/216; 285/198; 408/105
[58] Field of Search ............... 137/315, 317, 318; 285/197, 198, 199; 222/5, 83, 83.5, 89, 91; 408/87, 103, 104, 105, 107; 251/216

[56]  References Cited
U.S. PATENT DOCUMENTS

| | | | |
|---|---|---|---|
| 2,875,777 | 3/1959 | Lacart | 137/318 |
| 3,115,889 | 12/1963 | Franck et al. | 137/318 |
| 3,198,206 | 8/1965 | O'Brien | 137/318 |
| 3,252,475 | 5/1966 | Jones | 137/318 |
| 3,480,036 | 11/1969 | Ehrens et al. | 137/318 |
| 3,788,345 | 1/1974 | Tura | 137/318 |
| 4,157,195 | 6/1979 | Costanzo et al. | 285/198 |
| 4,537,214 | 8/1985 | Cowan | 137/318 |

Primary Examiner—George L. Walton
Attorney, Agent, or Firm—Alfred M. Walker

[57] ABSTRACT

A connector for establishing a communication between an existing water pipe and an additional conduit has a clamp arranged to clamp an existing water pipe and including a clamp housing and clamping elements cooperating with the latter, and a valve arranged to pierce the existing water pipe and establish a communication between the existing water pipe and the additional conduit, wherein a housing of the valve and the housing of the clamp together form an integral one piece housing element. A plunger of the valve has a contact surface which can be brought in contact with a seal and interrupt the communication in a water tight manner.

1 Claim, 3 Drawing Sheets

CONNECTOR FOR WATER PIPES

BACKGROUND OF THE INVENTION

The present invention relates to a connector for water pipes and more particularly to a connector for establishing a communication between an existing water pipe and an additional water conduit.

Connectors of the above mentioned general type are known in the art. One of such connectors includes a clamp which is formed to clamp an existing pipe, and a valve which is provided with a piercing plunger to pierce the existing pipe and to establish thereupon a communication between the interior of the pierced existing pipe and an additional pipe. The above described connector possesses some disadvantages. The clamp and the valve of the known connector are separate units provided with several parts which are difficult to assemble in tight areas. The connector provides for "open only" operation, i.e. after the existing pipe has been pierced and communication established, the valve cannot completely shut off the connection between the two pipes. Finally, due to the provision of the separate clamp and valve in the known connector, the additional joints between the parts leak. Also, under the action of high forces which are required for clamping, the joint between the clamp and the valve can break. It is to be understood that it is desirable to eliminate the above listed disadvantages.

SUMMARY OF THE INVENTION

Accordingly, it is an object of the present invention to provide a connector for communicating an existing pipe with an additional conduit, which avoids the disadvantages of the prior art.

In keeping with these objects and with others which will become apparent hereinafter, one feature of the present invention reside, briefly stated, in a connector of the above mentioned type provided with a clamp and a valve, in which a clamp housing and a valve housing together form an integral one-piece housing element which surrounds an existing pipe and connects the latter with an additional conduit.

When the connector is designed in accordance with the present invention, it has considerably less parts and therefore is easier to assemble in tight places. Additional joints which are susceptible to leaks are eliminated, and the connector does not break under the action of high forces applied for tightening.

In accordance with another advantageous feature of the present invention, a plunger of the valve has a surface which, upon piercing the existing pipe, can be brought in tight contact with a seal and watertightly interrupt the communication between the existing pipe and the additional conduit. The thusly designed connector permits not only the "open" operation, but also the closing of the existing pipe.

The novel features of the present invention are set forth in particular in the appended claims. The invention itself, however, will be best understood from the following description of a preferred embodiment, which is accompanied by the following drawings.

DESCRIPTION OF A PREFERRED EMBODIMENT

Figure 1:
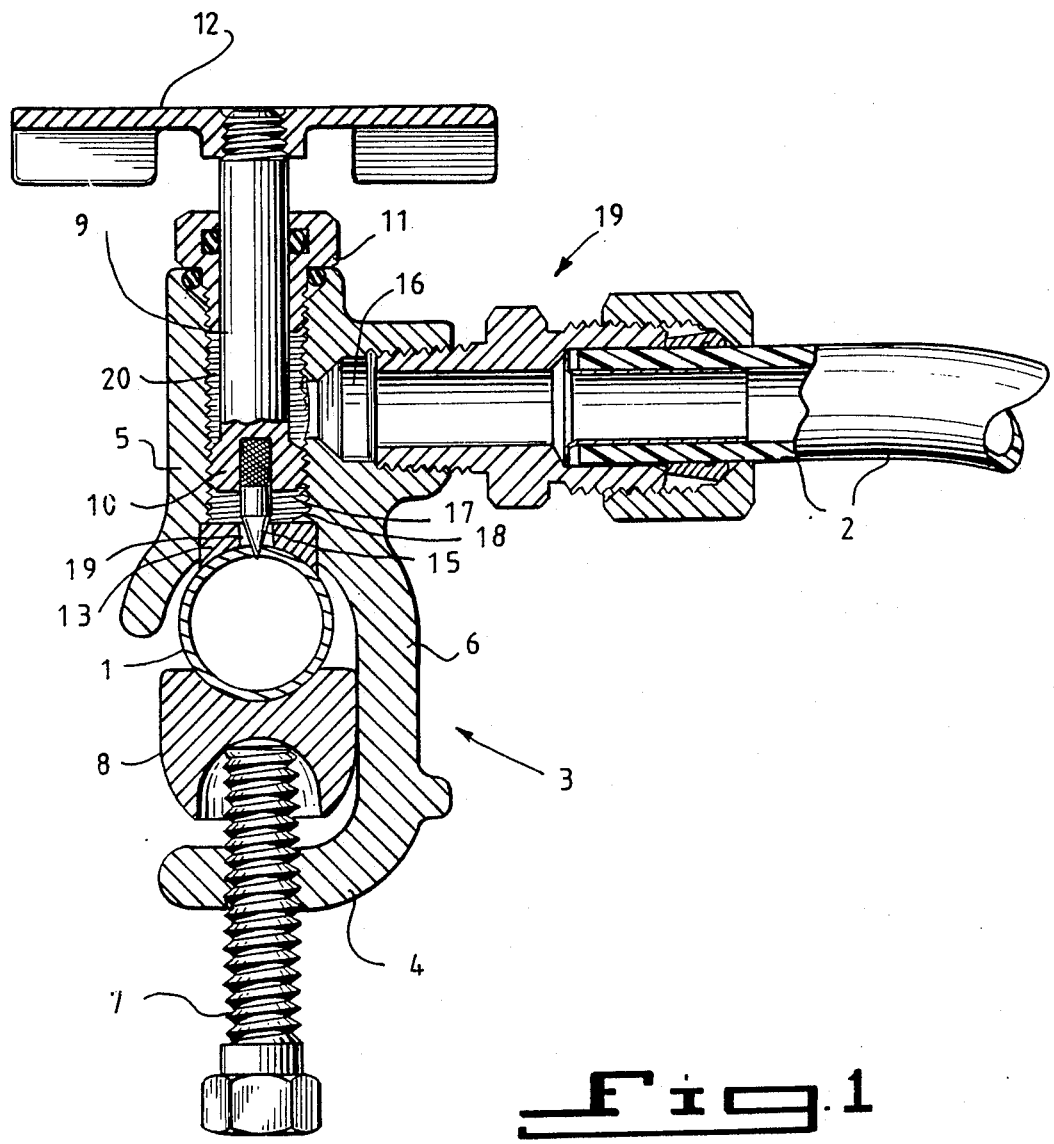
FIG. 1 is a view showing a section of a connector for connecting two water conduits in accordance with the present invention.
Figure 2:
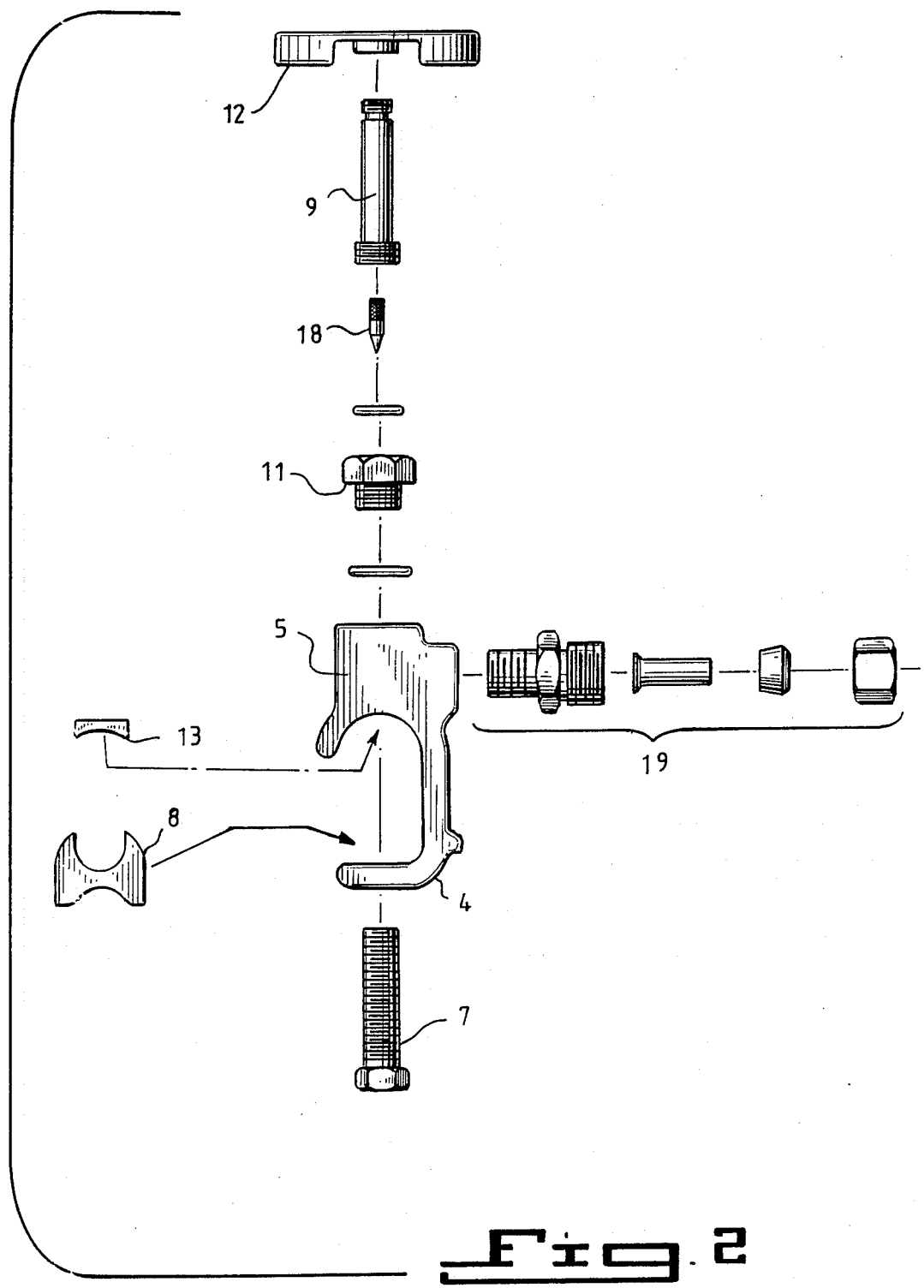
FIG. 2 is an exploded view of the inventive connector.

A connector for connecting an existing pipe 1 to an additional conduit 2 in accordance with the present invention has an integral one-piece housing element 3 which simultaneously forms a housing for a clamp and a housing for a valve of the connector.

The housing element 3 extends over an angle which is greater than 180° from the point where piercing member 15 is held by plunger 9 within top housing portion 5 of housing element 3 through an arc extending through connecting portion 6 of housing element 3 to bottom housing portion 4 of housing element 3. Said two housing portions 4 and 5 are located diametrically opposite to one another and a connecting portion 6 which connects the housing portions 4 and 5 with one another. A threaded member 7 extends through a threaded opening provided in the housing portion 4 and cooperates with a pressure pad 8 of the clamp. By screwing in of the threaded member 7, the pad 8 is displaced toward the existing pipe 1 and is simultaneously guided over the connecting portion 6 of the housing element 3.

The valve of the connector includes a plunger 9 which is guided with its one threaded end 10 in a threaded opening of the housing portion 5 and with its central part in a nut 11 screwed in the housing portion 5. The opposite end of the plunger 9 is provided with a handle 12. The valve further has a seal 13 which is to be placed onto the existing pipe 1 at the opposite side relative to the pad 8. The seal 13 has a central opening 14, so that a piercing member 15 of the plunger 9 can extend through the opening 14 for piercing the existing pipe 1, as will be explained hereinbelow.

The valve further has an outlet opening 16 formed in the housing portion 5 and leading to the additional conduit 2 to be connected with the existing pipe. The end 10 of the plunger 5 has a surface 17 which faces toward seal 13, while the seal 14 has a surface 18 which faces toward the plunger 5. The surfaces 17 and 18 exactly correspond to one another. For example, they are smooth so that they can be brought in tight contact with one another to prevent water leak therebetween for the purpose which will be explained hereinbelow.

Figure 3:
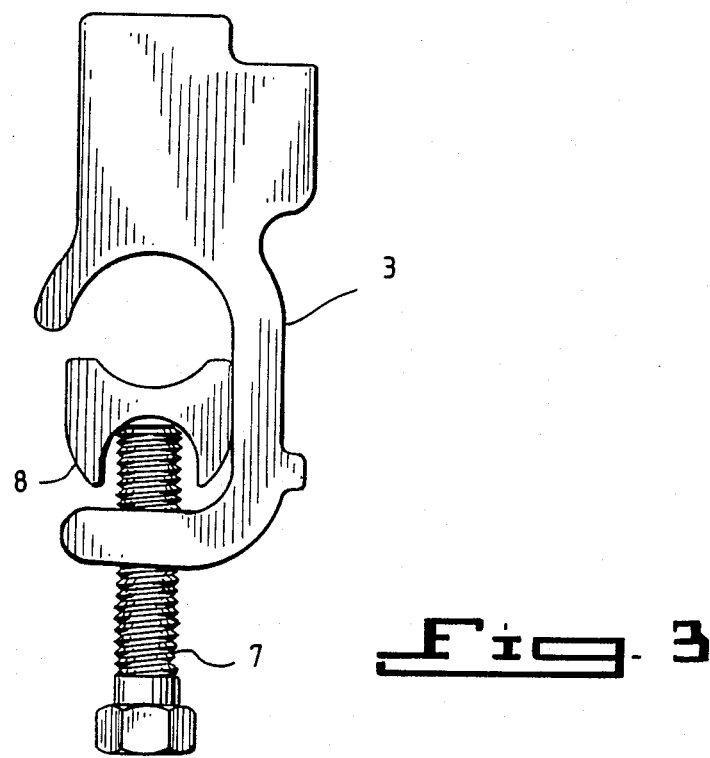
FIGS. 3 and 4 show two assemblies which form important parts of the inventive connector.
Figure 4:
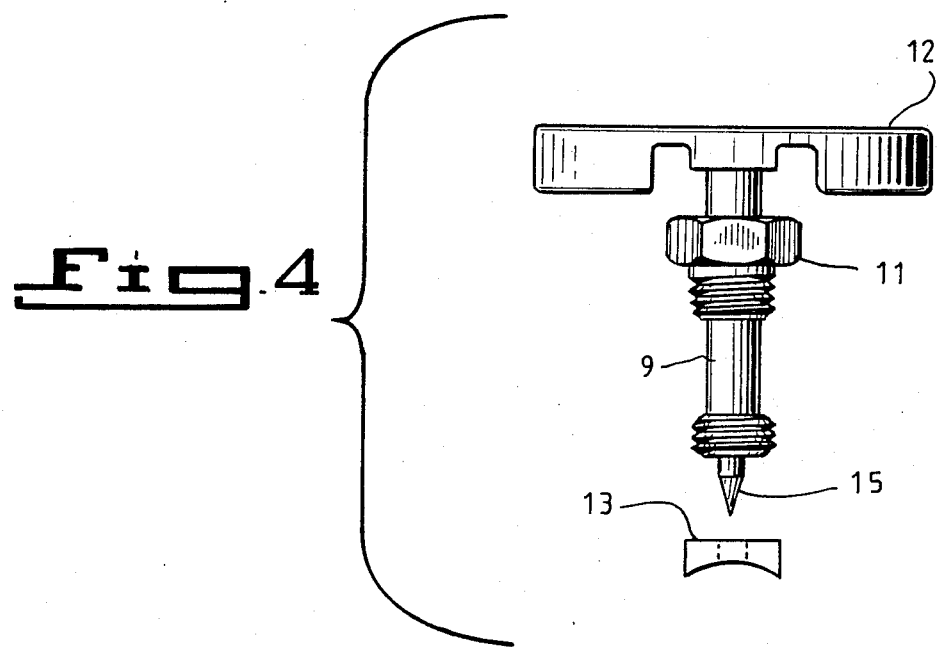

The connector for connecting the existing pipe 1 with the additional conduit 2 operates in the following manner:

First of all, the assembly shown in FIG. 3 is installed on the existing pipe. This assembly includes only three parts 3, 7 and 8 and therefore can be easily installed even in very tight places. Then the valve assembly of FIG. 4 with the seal 13 and the plunger 9 is inserted into the housing portion 5, and the additional conduit 2 is connected to the outlet opening 16 through intermediate elements 19. By turning the handle 12, the plunger 9 is lowered and the piercing member pierces the existing pipe 1. After retracting the plunger with the piercing member, a communication is established between the interior of the existing pipe 1 and the additional conduit 2 through the opening 14, a connecting passage 20, and the output opening 16. When it is necessary to interrupt the communication, the handle is turned in an opposite direction so that the plunger lowers and the surface 17 of the end 10 of the plunger 9 firmly abuts against the surface 18 of the seal 13 in a water tight manner.

The present invention is not limited to the details shown since various modifications and structural changes are possible without departing in any way from the spirit of the invention.

What is desired to be protected by Letters Patent is set forth in the appended claims.

I claim:

1. A connector for establishing a communication between an existing water pipe and an additional water conduit, the connector comprising:

a C-shaped clamp valve housing member arranged to clamp an existing water pipe and an adjustable clamping means cooperating with said clamp housing;

a valve arranged to pierce the said water pipe and to establish a communication between the latter and an additional water conduit, said valve including a valving piercing means cooperating with said valve housing, said clamp housing and said valve housing being formed integrally of one piece with one another so as to form an integral one piece housing unit;

a seal guide means disposed on said valving means for threadably plugging in upper portion of said valve housing and sealably guiding said valving means therein to control the piercing of said water pipe;

said housing having a bottom portion, said adjustable means including a threaded element received in said bottom portion;

an upstanding wall portion extending from said bottom portion to said upper portion of said valve housing on one side thereof and a downwardly projecting wall portion that protrudes over a portion of said water pipe to retain said water pipe and leaving an open portion between the bottom portion and the wall protrusion, said open portion permitting easy access for removal of said water pipe without disassembling said valve housing and said valve piercing member;

said adjustable clamping means including a threaded element received in said bottom portion, a support element disposed within said housing for supporting said water pipe, said support element having a recess for receiving said threaded element for adjustably moving said support element toward said piercing means and to adapt to different water pipe sizes.

* * * * *